United States Patent [19]

Evans

[11] Patent Number: 4,684,707

[45] Date of Patent: Aug. 4, 1987

[54] LOW COLOR, HIGH SOFTENING POINT AROMATIC RESIN AND METHOD FOR ITS PRODUCTION

[75] Inventor: Morris L. Evans, Baton Rouge, La.

[73] Assignee: Exxon Chemical Patents Inc., Linden, N.J.

[21] Appl. No.: 827,579

[22] Filed: Feb. 10, 1986

[51] Int. Cl.$^4$ .................... C08F 236/04; C08F 240/00
[52] U.S. Cl. .................................... 526/290; 526/237
[58] Field of Search ........................................ 526/290

[56] References Cited

U.S. PATENT DOCUMENTS

| | | | |
|---|---|---|---|
| 4,156,762 | 5/1979 | Kudo | 526/76 |
| 4,245,075 | 1/1981 | Lepert | 526/280 |
| 4,419,503 | 12/1983 | Benitez | 526/237 |

*Primary Examiner*—Christopher Henderson
*Attorney, Agent, or Firm*—J. F. Hunt

[57] ABSTRACT

Petroleum resins of lightened color while retaining satisfactory melting point and compatibility are provided by a process which comprises catalytically polymerizing an aromatic petroleum cracked or reformed fraction, e.g. an aromatic stream boiling between 80° C. and 260° C., sequentially treated with sulfuric Acid followed by distillation to provide an aromatic feedstock portion which is blended with an aliphatic petroleum cracking or reforming fraction feedstock portion containing cationically polymerizable hydrocarbons, less than 0.5 weight percent of cyclodienes and a pentadiene-1,3 to cyclodiene weight ratio of greater than 50, preferably at least 200 in the presence of a Friedel-Craft catalyst into a petroleum resin of lightened color and softening point in the range of 90° C. to 115° C.

2 Claims, No Drawings

LOW COLOR, HIGH SOFTENING POINT AROMATIC RESIN AND METHOD FOR ITS PRODUCTION

This invention relates to the production of low color, high softening point, aromatic petroleum resins and to the resins resulting therefrom. In particular, the invention relates to aliphatic/aromatic resins suitable as tackifiers for adhesive formulations particularly hot melt adhesives, hot melt pressure sensitive adhesives and solvent based pressure sensitive adhesives.

BACKGROUND OF THE INVENTION

The processing of crude petroleum gives rise to various hydrocarbon fractions which may be subsequently "cracked" by heating, usually in the presence of steam to produce a range of lower boiling products.

Many of the commercial applications of petroleum resins have over recent decades required that the resins be increasingly lighter in color to colorless.

For aliphatic to predominantly aliphatic feedstocks which are cationically polymerized, it was early reported in U.S. Pat. No. 2,734,046 that light colored resins can be produced from unsaturated predominantly aliphatic petroleum fractions obtained by steam cracking when the fraction is substantially free of cyclic dienes. It is thus known that these cracked predominantly aliphatic fractions contain cyclodienes which contribute to the formation of gel and adversely affect the color, clarity and other properties of the resin. U.S. Pat. Nos. 2,894,937 and 2,946,775 report that it is a simple matter to dimerize these cyclodienes by a thermal soaking treatment and to separate the dimerized hydrocarbons from the remainder and to use this remainder as the aliphatic feed for polymerization by aluminum chloride. Although the resulting resins were of lighter color and had desirable softening points, the colors obtained were still too dark for many industrial applications necessitated by technological developments in the pressure sensitive adhesives into which petroleum resins are incorporated. Resins of much lightened color were recently reported obtained (see U.S. Pat. No. 4,391,961) by heat soaking a petroleum cracking or reforming fraction containing cationically polymerizable hydrocarbons including from more than 0.5 to 2 weight percent of cyclodienes until the cyclodiene content is no more than 0.5 weight percent and the piperylene to cyclopentadiene weight ratio is above at least 50, distilling said heat soaked petroleum fraction, polymerizing said distilled petroleum fraction in the presence of an aluminum halide catalyst and recovering an aliphatic resin having a Gardner color of no greater than 4.

Unfortunately, the polymerization of an aromatic feedstock boiling between 80° C. and 260° C. and containing $C_8$ to $C_{10}$ olefinic aromatics such as styrene and indene, with a Friedel-Crafts catalyst such as $AlCl_3$ produces a dark colored resin (Gardner color of 11 to 13 based on a 50% solution in toluene). The literature reports improving the color and thermal stability of aromatic hydrocarbon resins by reacting an aromatic olefin feed stream with a dienophile, e.g. maleic anhydride, prior to polymerization (U.S. Pat. Nos. 4,105,843 and 4,230,840).

One approach to producing paler colored resins from a given petroleum fraction feedstock is to subject the feedstock to a concentrated sulfuric acid refining step followed by redistillation of the acid treated feedstock prior to its polymerization in the presence of a Friedel-Crafts catalyst into a petroleum resin (see U.S. Pat. No. 3,042,660, col. 1, lines 63–71).

It thus appears that it is more difficult to provide a light colored petroleum resin from aromatic olefin feedstock than it is from aliphatic olefin feedstock.

It is therefore an object of this invention to provide aromatic petroleum resins of much lighter color and having a suitably high softening point than presently known and/or available.

SUMMARY OF THE INVENTION

It has been discovered that sequentially treating an aromatic stream boiling between 80° and 260° C. which contains $C_8$ to $C_{10}$ olefinic aromatics such as styrene and indene at least twice, preferably 2 to 4 times, with concentrated sulfuric acid and thereafter distilling said stream to recover a lighter polymerization fraction ranging from 40 to 95 weight percent of said treated stream provided an aromatic feedstock portion that can be blended with from 5 to 80, preferably 15 to 60, weight parts of an aliphatic feedstock portion derived from heat soaked steam cracked naphtha having a cyclodiene content of less than about 0.5, preferably about 0.2, weight percent which has been distilled (whereby the dimers and codimers of said cyclodienes are separated from said heat soaked fraction) to a pentadiene-1, 3 to cyclodiene weight ratio of at least 50, preferably 200, to provide an aromatic aliphatic blended feedstock for polymerization that yields resins of lighter color and high softening point.

Thus, in accordance with this invention there has been realized a process for producing a petroleum resin of light color and high softening point which comprises polymerizing a feedstock blend of cationically polymerizable aliphatic and aromatic hydrocarbons in the presence of Friedel-Craft catalyst and recovering a resin having Gardner color of no greater than 4 when measured on a solution of equal weights of said resin and toluene and a softening point of 90° C. to 115° C. as determined by ASTM Procedure E-28, said blend comprising from 0.05 to 4 and preferably 0.18 to 1.5 weight parts of an aliphatic feedstock portion per weight part of an aromatic feedstock portion, said aliphatic feedstock portion comprising an aliphatic petroleum cracking or reforming feedstock fraction containing cationically polymerizable aliphatic hydrocarbon, less than 0.5 weight percent of cyclodienes and a pentadiene-1,3 weight ratio to cyclodiene of greater than 50 and said aromatic feedstock portion comprising an aromatic stream boiling between 80° C. and 260° C. treated sequentially at least twice with sulfuric acid preferably concentrated sulfuric acid, and thereafter distilled to recover said aromatic feedstock portion.

More particularly, the invention is embodied in the preparation of improved petroleum resins which comprises blending: (A) an aliphatic feedstock portion obtained by isolating a steam cracked hydrocarbon petroleum fraction boiling between about more than 20° C. to less than 140° C., said fraction being substantially below $C_9$, and thereafter heating said steam cracked fraction at about 90° C. to 140° C. to dimerize the cyclodienes, stripping the resulting fraction at a temperature sufficient to separate an overhead product from the dimerized cyclodienes, recovering as the overhead product a stream boiling between about more than 20° C. to less than 140° C. and having the following composition:

| Component | Weight Percent |
| --- | --- |
| Benzene | 15-30 |
| Toluene | 3-10 |
| $C_8$ Aromatics | 1 |
| Diolefins | 11-25 |
| Olefins | 70-29 |
| Paraffins | 0-5 | said composition having a cyclodienes content of about 2 weight percent and more than 3.5 weight percent isoprene, fractionating said overhead product to reduce the isoprene content to below about 3.5 weight percent, and recovering a fraction reduced in isoprene content and having the following distillation analysis:

| Distillation | Weight Percent |
| --- | --- |
| I.B.I. - 38° C. | 0-15 |
| 38-70° C. | 25-50 |
| 70-130° C. | 35-70 |
| 130° C.+ | 5 |

These overhead streams are heat soaked at from 135° C. to 160° C. for 1.5 to 5 hours whereby the cyclodiene content is reduced from about 2.0 to at least 0.5 weight percent. The heat soaked streams are distilled rejecting the heavier fraction of dimers formed without heating to the bottom stream whereby the resin feed stream is separated from the dimers and codimers of the cyclodienes to provide the aliphatic feedstock portion having cis and trans pentadiene-1,3 to cyclodiene weight ratio no greater than 50; and (B) an aromatic feedstock portion obtained by sequentially treating a steam cracked aromatic petroleum fraction boiling between about more than 80° C. to less than 260° C., said fraction being predominantly $C_8$ to $C_{10}$ olefinic aromatics, with concentrated sulfuric acid, distilling the treated fraction whereby from 40 to 95% of the overhead distillate is recovered to be used as the aromatic feedstock portion said aliphatic portion ranging from 5 to 80, preferably 15 to 60, percent based on the total weight of the blended portions of the feedstock.

DETAILED DESCRIPTION OF THE INVENTION

The invention is concerned with the production of cationically catalyzed aromatic petroleum resins of lightened color and high softening point. The improved resin is realized by utilization of a feedstock which is the blend of an aliphatic portion and an aromatic portion.

(A) The Aliphatic Feedstock Portion

This portion of the feedstock is a $C_5/C_6$ highly unsaturated petroleum fraction produced from the stream cracking of petroleum gas oil fractions or heavy naphthas. The resulting liquid cut boiling below about the boiling point of $C_9$ olefins but containing components up to $C_{14}$ is segregated and heated at from about 90° C. to 140° C. to dimerize the cyclodienes. Thereafter a $C_8$ to $C_9$ and lighter liquid cut including $C_5$ is taken overhead and there is separated a dimer concentrate as bottoms. The overhead stream has a materially reduced content, i.e. about 2 weight percent, of cyclodienes, most usually cyclopentadiene and methyl cyclopentadiene.

This overhead stream is then fractioned to remove at least half of the isoprene containing fraction boiling below 38° C. and is the raw material, which is thereafter heat soaked to provide a feed material having a cyclodiene content of less than about 0.5, preferably less than 0.2, weight percent.

Table I shows the typical boiling characteristics of the overhead streams and the composition (as computed by Gas Chromatography).

TABLE I

Typical Boiling Characteristics
For Overhead Streams
[Boiling range 20-140° C., predominantly 30-130° C. and containing 15 wt. percent or less of substances boiling below 38° C. (including 3.5 wt. percent or less isoprene on the total stream)]

| | Distillation Range | |
| --- | --- | --- |
| | I.B.P. - 38° C. | 0-15 wt. % |
| | 38-70° C. | 25-50 wt. % |
| | 70-130° C. | 35-70 wt. % |
| | 130° C. | 5 |
| Composition | | |
| Diolefins, Conj. | 11-25 | |
| Isoprene | | 1.5-3.5 |
| Piperylene | | 7-15 |
| Cyclopentadienes | | 1.5-2.5 |
| Others | | 4-7.5 |
| Aromatics | 18-41 | |
| Benzene | | 15-30 |
| Toluene | | 3-10 |
| $C_8$ Aromatics | | 1 |
| Paraffins | 0-5 | |
| Mono-Olefins | 29-70 | |

These overhead streams are heat soaked at from 135° C. to 160° C., preferably 140° C. to 150° C., for 1.5 to 5, hours whereby the cyclodiene content is reduced from about 2.0 to at least 0.5, preferably at least 0.2, weight percent. The heat soaked streams are distilled as by conventional methods capable of rejecting to the heavier fraction the dimers formed without heating the bottom stream sufficiently to recrack the formed dimers whereby the resin feed stream is separated from the dimers and codimers of the cyclodienes to provide the aliphatic feedstock portion having a typical analysis as seen in Table II wherein the feedstock was heated soaked at 149° C. for five hours and then adjusted by distillation.

TABLE II

| | wt. % |
| --- | --- |
| Diolefins | |
| Isoprene | 1.3 |
| c & t-Pentadiene-1, 3* | 44.5 |
| Cyclopentadiene | 0.18 |
| Monoolefins | 37.6 |
| Paraffins | 3 |
| Benzene | 1 |
| Toluene | — |
| Piperylene / cyclopentadiene | 247 (ratio) |

*Combination also known as piperylene

The weight ratio of piperylene to cyclopentadiene remaining after heat soaking and distillation in the resin feed should be at least 50, preferably 100, optimally over 200, as seen in Table II.

In summary, the aliphatic feed would usefully have the following broad composition as seen in Table III:

TABLE III

| Component | Wt. % Range |
|---|---|
| Pentene-1 | 1–5 |
| Isoprene | 0.5–3 |
| c & t-Pentene-2 | 5–10 |
| 2-Methylbutene-1 & 2 | 1–15 |
| c & t-Pentadiene-1,3 | 20–50 |
| Cyclopentene | 12–20 |
| 3 & 4-Methylpentene | 1–5 |
| Cyclopentadiene | 0.05–0.2 |
| c & t-pentadiene cyclopentadiene | >50 (ratio) |

(B) The Aromatic Hydrocarbon Fraction

The aromatic hydrocarbon fraction can be characterized as a highly unsaturated petroleum fraction produced from the steam cracking of petroleum gas oil fractions or heavy naphthas. This fraction is a vinyl aromatic fraction boiling between 80° C. and 260° C., preferably between 130° C. and 230° C. in which styrene, methylstyrenes and indenes are the primary unsaturated constituents. According to the conditions of cracking and fractionation, various di-unsaturated hydrocarbons including dicyclopentadiene and divinyl compounds, may also be present as minor constituents.

A highly useful aromatic fraction is that in which none of the unsaturated constituents boils below 80° C., preferably none below 120° C. and at least 70%, preferably 95% of the total weight of the unsaturated constituents consists of one or more of the substances styrene, methylstyrenes, and indenes, and said total weight does not contain as much as 10% of any diunsaturated substance.

A highly useful vinyl aromatic fraction is styrene 4–10%, alpha-methylstyrene 1–5%, vinyl toluenes 10–30%, indene 7–15% and methylindenes 0–10%.

The aromatic fraction is sequentially treated with an acidic agent. The useful acidic agents are represented by strong acids and include sulfuric acid, oleum, methane sulfonic acid, acidic solid ion exchange resins, e.g. Amberlyst ® 15 sold by Rohm & Haas of Philadelphia, PA, acidic molecular sieves and sulfonated acids, e.g. p-toluene sulfonic acid, all of which can be characterized as Bronsted acids.

The preferred acidic agent is sulfuric acid optimally used as concentrated sulfuric acid of 92% to 108% concentration. Sulfuric acid has been widely used in the chemical refining of petroleum (see Chemical Refining of Petroleum by V. A. Kalichevsky and B. A. Stanger and ACS monograph published in 1942 by the Reinhold Publishing Corporation of N.Y., N.Y. and in particular Chapter II entitled Treatment With Sulfuric Acid, pages 45-55).

The acidic agent is used in amounts ranging from 0.1 to 1.0 preferably 0.2 to 0.7, optimally from 0.2 to 0.5 weight percent based on the total weight of the aromatic feedstock portion. Treatment times range from 0.008 to 10, preferably 0.08 to 5, optimally 0.25 to 3, hours residence time at a temperature of 0° C. to 200° C., preferably ambient to 150° C.

Distillation is necessary to substantially free the acid treated aromatic fraction of the acidic agents so that the fraction will not have contaminants which poison or otherwise reduce the efficiency of the catalyst and/or darken the resin. Vacuum distillation is used to recover an aromatic portion having a boiling range of 80° C. to 260° C. whereas the aliphatic distillate portion will typically be of a boiling range of 15° C. to 80° C. Conventional distillation processes and equipments are employed. Typically, a useful aromatic hydrocarbon feedstock portion contains:

TABLE IV

| Component | Wt. % |
|---|---|
| Styrene | 4–10 |
| Alpha-Methylstyrene | 1–5 |
| m-Methylstyrene | 7–15 |
| o-Methylstyrene | 1–5 |
| p-Methylstyrene | 2–10 |
| β-Methylstyrene | 1–7 |
| Indene | 7–15 |
| Divinylbenzene | 0–5 |
| Methylindenes | 0–10 |

The acid refined aromatic feedstock portion which is blended with the aliphatic feedstock portion in from 0.25 to 19 weight parts per weight part of aliphatic feedstock.

The blended feedstock may be polymerized in a conventional manner with conventional Friedel-Crafts catalyst preferably aluminum trichloride catalyst. The polymerizations can be run either batch wise or continuous.

In batch runs the blended feedstock is added to the catalyst under an inert pressurized atmosphere. The usual catalyst concentrations are in the range of 0.2 to 5 weight percent and preferably 0.2 to 3.0 weight percent based on the resin feedstock. The aliphatic/aromatic blended feedstock is adjusted to the polymerization temperature of about −5° to 60° C. and maintained at that temperature the prescribed length of time. The preferred conditions using aluminum chloride as the catalyst is 0.6 percent AlCl$_3$ for a reaction temperature of 0° C. for a period of about 1 to 2 hours.

In the continuous runs, catalyst and aliphatic-aromatic feedstock are added to a stirred pressurized reactor maintained at the polymerization temperature under an inert atmosphere. The concentration of aluminum chloride catalyst is usually in the range of 0.2 to 3 and preferably 0.3 to 0.8 by weight with the temperatures of the reactor at −5° to 60° C. The most suitable feed addition rate gives an approximate residence time of 0.3 to 2.0 hours. The resin thus formed may be recovered by water and/or alkali washing to remove catalyst, followed by stripping of the unpolymerized material. However, other methods for removing the catalyst from the polymerized products may be used.

The washed resin solutions are then stripped of unreacted hydrocarbons boiling up to the end point of the feed naphtha, about 260° C. The resulting crude resin concentrate is then stripped under vacuum or with steam to remove liquid polymer and to recover a solid resin product having a softening point of 90° C. to 115° C. and a very pale color.

The resin is also characterized by proton and carbon 13 ($C_{13}$) NMR as follows (all percents are in weight percent based on the total weight of the resin):

35 to 65%, preferably 40 to 60%, optimally 45 to 55% aromatic and non-aromatic unsaturated carbons;

35 to 65% preferably 40 to 60%, optimally 45 to 55% saturated carbons;

1 to 15%, preferably 2 to 8% of the protons bonded to non-aromatic unsaturated carbons;

50 to 80%, preferably 62 to 72% of the protons bonded to saturated carbons;

15 to 35%, preferably 22 to 32% of the protons bonded to aromatic carbons;

The invention is described in more complete detail by the following examples although it is not intended to limit the scope of the invention thereto.

EXAMPLE 1

An aliphatic aromatic feedstock blend of the following composition:

TABLE V

| Monomer | wt. % |
| --- | --- |
| 2-Methylbutene-2 | 1-4 |
| c & t-Pentadiene-1,3 | 5-15 |
| Cyclopentene | 3-10 |
| Styrene | 4-8 |
| alpha-Methylstyrene | 1-4 |
| m-Methylstyrene | 5-12 |
| o-Methylstyrene | 1-4 |
| p-Methylstyrene | 1-8 |
| β-Methylstyrene | 1-6 |
| Indene | 5-12 | was cationically polymerized at 0° C. with 0.6 wt. % $AlCl_3$ catalyst for 1 hour. The resulting polymerizate was stripped by heating to 250° C. under nitrogen to remove unreacted materials, then stripped with stream at 250° C. and the resultant resin product was evaluated. The properties of the resin are set forth in Table VI.

TABLE VI

| Softening Point, °C. (a) | 98.5 |
| --- | --- |
| Color, Gardner (b) | 1.6 |
| Yield, % | 35.6 |
| Cloud Point °C. (c) | 115 |
| Tg °C. | 46.5 |
| GPC Molecular Weight (Polyisobutylene Standard) | |
| Number Average (Mn) | 968 |
| Weight Average (Mw) | 1532 |
| Mw/Mn | 1.6 |
| Peak | 1250 |

(a) measured according to ASTM E-28
(b) 50 wt. % resin solution in toluene
(c) The temperature at which there is an appearance of haze or "cloud" in a mix of 20 parts 60° C. melt point paraffin wax, 30 parts of Escorene ® 7750 (ethylene vinylacetate) and 50 parts test resin heated to 200° C. and allowed to cool in air with stirring.
(d) measured Glass Transition Temperature Tg by DSC.

A blend of resins batch polymerized from the feed and under these conditions was analyzed by proton and $C_{13}$ NMR. The results are as follows:

50.6 weight percent of the carbon atoms are aromatic and non-aromatic unsaturated;

49.4 weight percent of the carbon atoms are saturated;

27.6 weight percent of the hydrogen atoms are bonded to aromatic carbons;

67.8 weight percent of the hydrogen atoms are bonded to saturated carbons;

4.6 weight percent of the hydrogen atoms are bonded to non-aromatic unsaturated carbons.

The composition of the resin is illustrated by the values set forth in Table VII.

TABLE VII

| Resin Monomer Composition: | |
| --- | --- |
| Monomer | Calculated Mole % in Resin |
| 2-Methylbutene-2 | 1-5 |
| c & t-Pentadiene-1,3 | 10-25 |
| Cyclopentene | 1-7 |
| Styrene | 7-20 |
| alpha-Methylstyrene | 1-5 |
| m-methylstyrene | 15-35 |
| o-Methylstyrene | 4-11 |
| p-Methylstyrene | 8-20 |
| β-Methylstyrene | 1-5 |
| Indene | 10-25 |

The invention in its broader aspect is not limited to the specific details shown and described and departures may be made from such details without departing from the principles of the invention and without sacrificing its chief advantages.

What is claimed is:

1. A predominantly aromatic resin having a softening point range of 90° to 115° C., a color Gardner of less than 4 and a cloud point less than 120° C. and a glass transition temperature of about 38° C. to 60° C. wherein said aromatic petroleum resin comprises 35 to 65 weight percent aromatic and non-aromatic unsaturated carbons as measured by $C_{13}$ NMR; and 35 to 65 weight percent saturated carbons with 1 to 15 weight percent of the hydrogens bonded to non-aromatic unsaturated carbons as measured by proton NMR and 50 to 80 weight percent of the hydrogens bonded to saturated carbons and 15 to 35 weight percent of the hydrogens bonded to aromatic carbons.

2. A predominantly petroleum resin according to claim 1 having a monomer composition comprising 2-Methylbutene-2, 1-5 mole %; c&t-Pentadiene-1-3, 10-25 mole %; Cyclopentene, 1-7 mole %; Styrene, 7-20 mole %; alpha-Methylstyrene, 1-5 mole %; m-methylstyrene, 15-35 mole %; o-Methylstyrene, 4-11 mole %; p-Methylstyrene, 8-20 mole %; β-Methylstyrene, 1-5 mole %; and Indene, 10-25 mole % said mole % based on the resin.

* * * * *